C. W. RABBIT.
ATTACHMENT FOR PLANTERS.
APPLICATION FILED APR. 26, 1911.
1,008,064.
Patented Nov. 7, 1911.
2 SHEETS—SHEET 1.
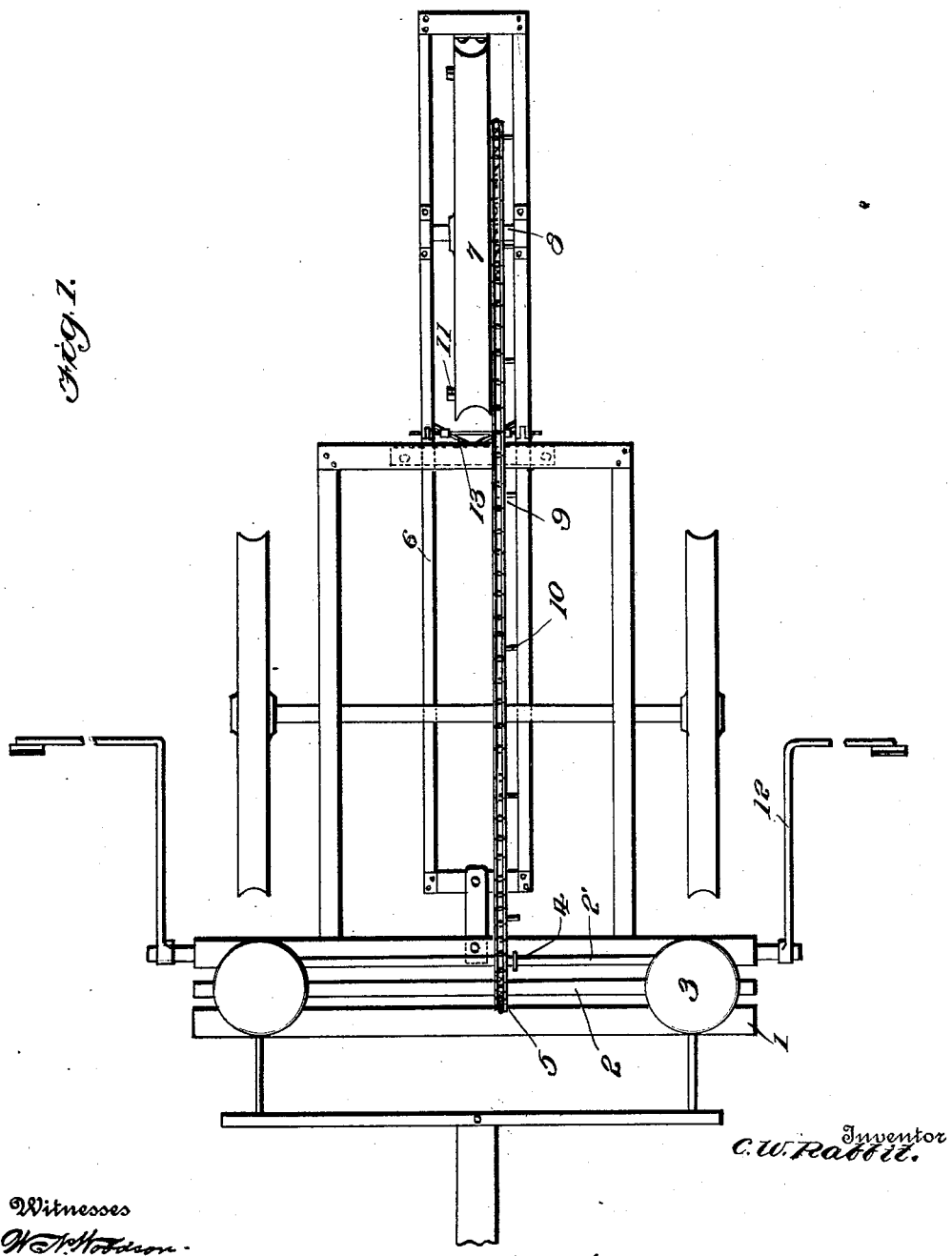

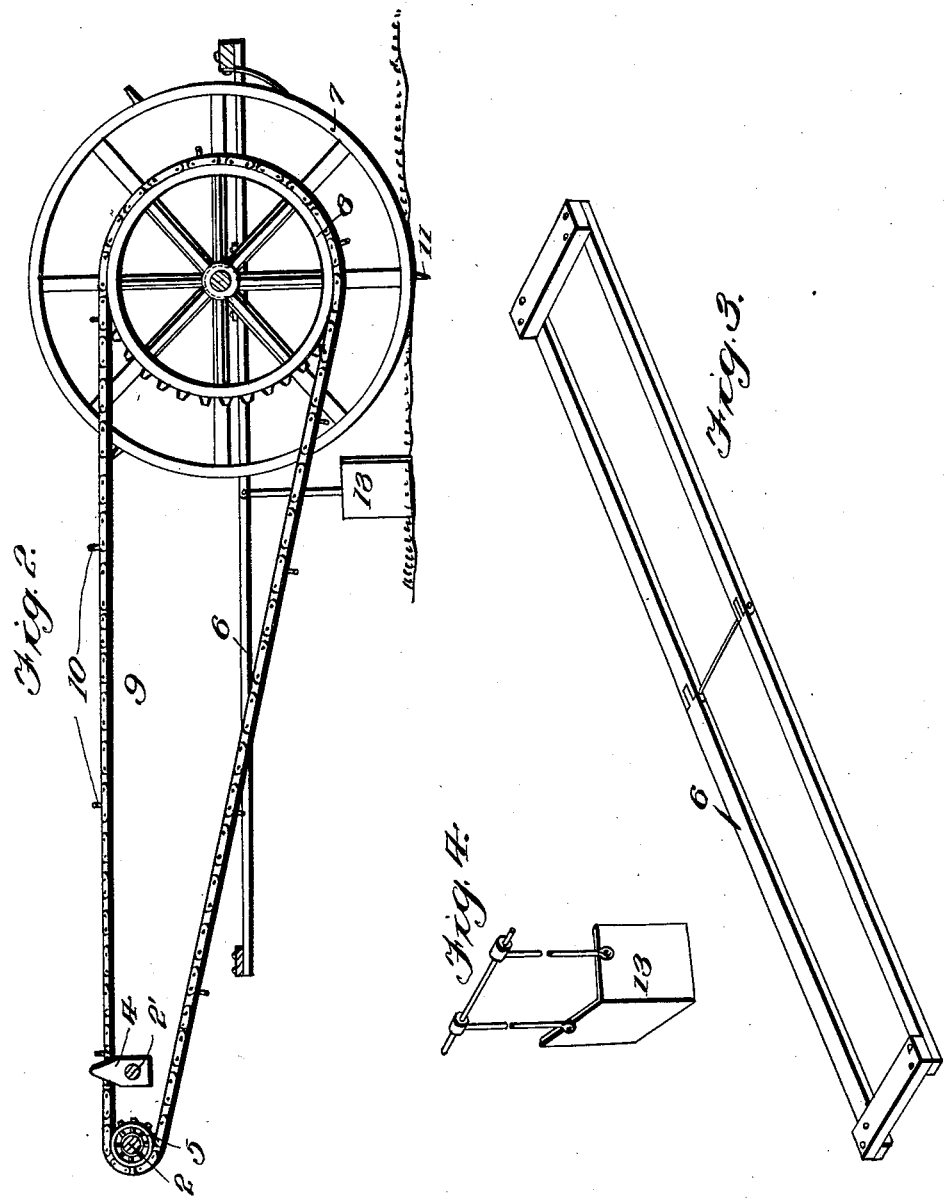

UNITED STATES PATENT OFFICE.

CHARLES W. RABBIT, OF AMBOY, ILLINOIS.

ATTACHMENT FOR PLANTERS.

1,008,064.   Specification of Letters Patent.   Patented Nov. 7, 1911.

Application filed April 26, 1911. Serial No. 623,476.

*To all whom it may concern:*

Be it known that I, CHARLES W. RABBIT, a citizen of the United States, residing at Amboy, in the county of Lee and State of Illinois, have invented certain new and useful Improvements in Attachments for Planters, of which the following is a specification.

This invention has relation to planter attachments, and has for its object to provide a wireless check row hill marker especially adapted to be used upon corn and similar planters.

The object of the invention is to provide a simple and effective means for marking or indicating in the soil the hills as they are planted, in order that the said marks may be followed upon the return of the planter along the next row, whereby the hills may be formed in the soil in check row.

With this object in view the attachment includes a frame adapted to be pivotally connected with the frame of the planter and which is supported at its rear portion upon a ground wheel. The ground wheel is provided upon its periphery with a series of trowels, and a sprocket wheel is arranged to rotate with the ground wheel. A wheel is mounted upon the shaft of the planter which operates the seed selecting mechanism of the boxes, and a sprocket chain is trained around the said sprocket wheel. An arm is mounted upon the shaft which operates the seed dropping devices and the said chain carries tappets which are adapted to engage the said arm and swing the same, whereby its attached shaft is partially rotated and the seed devices are operated. The tappets upon the chain are so arranged with relation to the trowels upon the ground wheel that as the said tappets operate the seed dropping devices the said ground wheel following the said devices causes one of its trowels to make an impression in the soil between the hills and in check row alinement with the same, and these impressions are followed as guides upon the return of the planter to maintain check row alinement throughout the planting.

For a full understanding of the invention reference is to be had to the following description and accompanying drawings, in which:

Figure 1 is a top plan view of a portion of a planter with the attachment applied; Fig. 2 is a side elevation of the same; Fig. 3 is a perspective view of the frame of the attachment; and Fig. 4 is a perspective view of a fender used upon the attachment.

Corresponding and like parts are referred to in the following description and indicated in all the views of the accompanying drawings by the same reference characters.

As illustrated in the accompanying drawings, the planter 1 is provided with a shaft 2 which is operatively connected with the seed selecting devices (not shown) of the boxes 3. The planter and the said devices and boxes may be of any form or pattern. However, in the present instance an arm 4 is fixed to the shaft 2' which operates the dropping devices, also a sprocket wheel 5 is mounted upon the shaft 2.

The frame 6, composed of hingedly connected sections, is pivotally connected at its forward end with the frame of the planter 1, and the rear portion of the frame 6 is supported upon a ground wheel 7. A sprocket wheel 8 is arranged to rotate in unison with the ground wheel 7, and a sprocket chain 9 is trained around the sprocket wheels 5 and 8. The chain 9 carries at intervals along its length tappets 10 which are adapted to engage the arm 4 successively and swing the same, whereby the shaft 2' is partially rotated and the seed selecting and dropping devices of the boxes 3 are operated. The ground wheel 7 is provided upon its periphery with a series of trowels 11, and the said trowels are adapted to be forced into the soil as the wheel 7 rotates, whereby they make impressions in the soil in check row alinement with the plantings which have just previously been made by the actuation of the shaft 2'.

Guides 12 are mounted upon the sides of the frame of the planter 1, and as the planter returns along a row just completed, the said guides 12 are caused to travel over the impressions made in the soil at the previous planting by the trowels 11 so that each succeeding row is planted in proper relation to the preceding row. When the planter arrives at the end of a row and it is turned around, it is not started back across the field until one of the guides 12 is directly over the last impression made in the completed row by one of the trowels 11. The rear portion of the frame 6 may then be lifted so that the wheel 7 may be turned until one of the trowels 11 is directly below its center, at which time the arm 4 will have been engaged by one of the tappets 10 and the shaft 2' is partially turned whereby the seed selecting and dropping devices of the boxes 3 have been operated and dropped the seed in the hills. The planter may then be started along the return row and the regularity of the check row planting will be maintained.

A fender 13 is carried by the frame 6 and is located in advance of the wheel 7 and is adapted to brush away from the path of the said wheel stones, clods or other obstruction at the surface of the soil.

Having thus described the invention, what is claimed as new is:

In combination with a planter having a shaft for actuating seed selecting and dropping devices, an arm fixed to the said shaft, a check row attachment comprising a frame made up of sections hingedly connected together for vertical swinging movement, means for pivotally connecting one of the said sections with the planter frame for horizontal swinging movement, a ground wheel journaled in the other frame section, trowels mounted upon the periphery of the ground wheel, a sprocket wheel arranged to rotate with the ground wheel, a sprocket wheel journaled upon the planter frame, a sprocket chain trained around the sprocket wheels, tappets carried by the chain and adapted to encounter said arm and a fender carried by the first mentioned frame section in advance of said ground wheel.

In testimony whereof, I affix my signature in presence of two witnesses.

CHARLES W. RABBIT. [L. S.]

Witnesses:
JOHN P. HARVEY,
PETER O'CONNOR.

---

Copies of this patent may be obtained for five cents each, by addressing the "Commissioner of Patents, Washington, D. C."